No. 651,809. Patented June 12, 1900.
P. T. PERKINS.
ROTARY MOTOR.
(Application filed Nov. 6, 1899.)
(No Model.) 3 Sheets—Sheet 1.
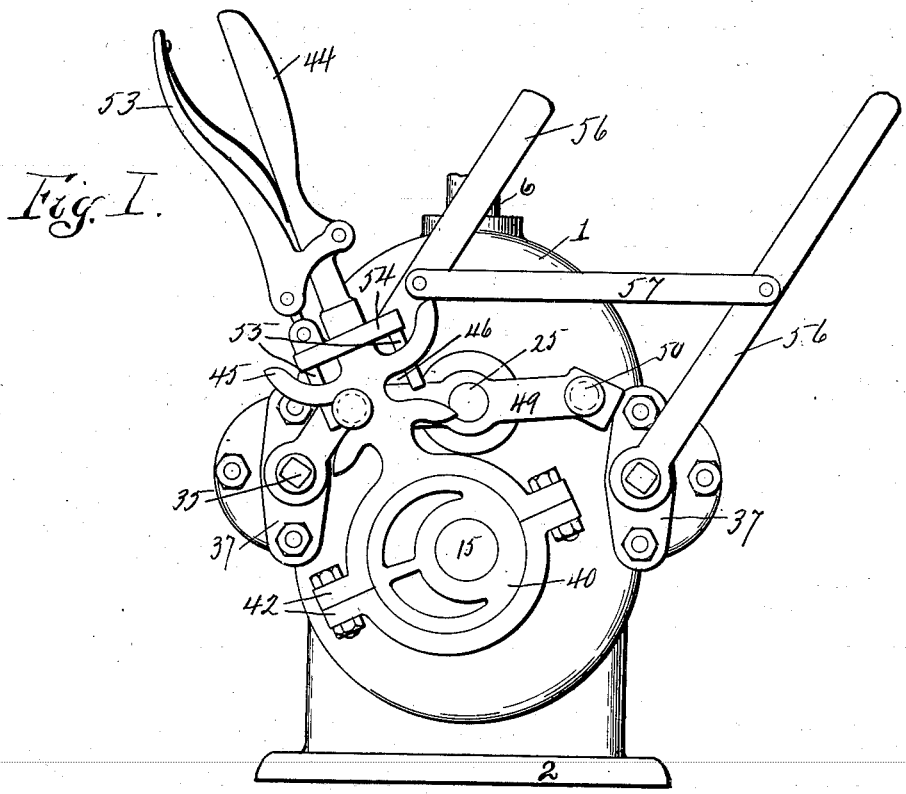
Fig. I.
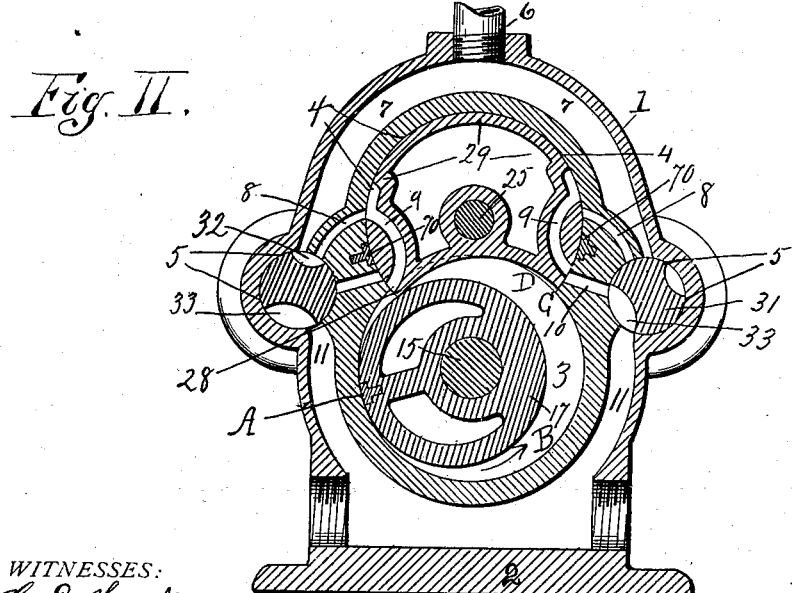
Fig. II.
WITNESSES:
C. E. Tomlinson
N. T. Brownell
INVENTOR.
Pardon T. Perkins
BY Alfred Wilkinson
ATTORNEY.

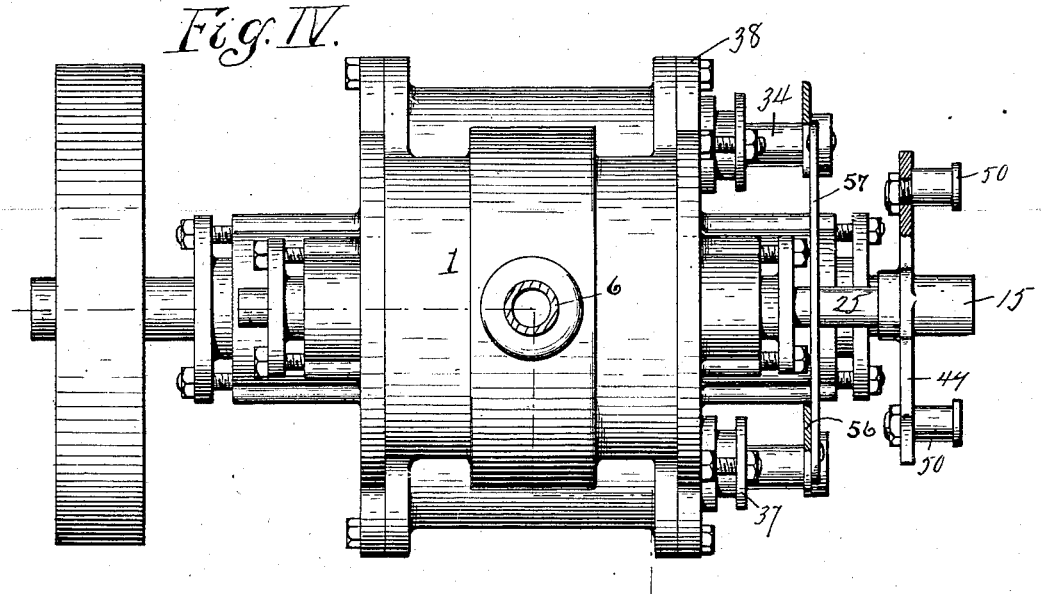
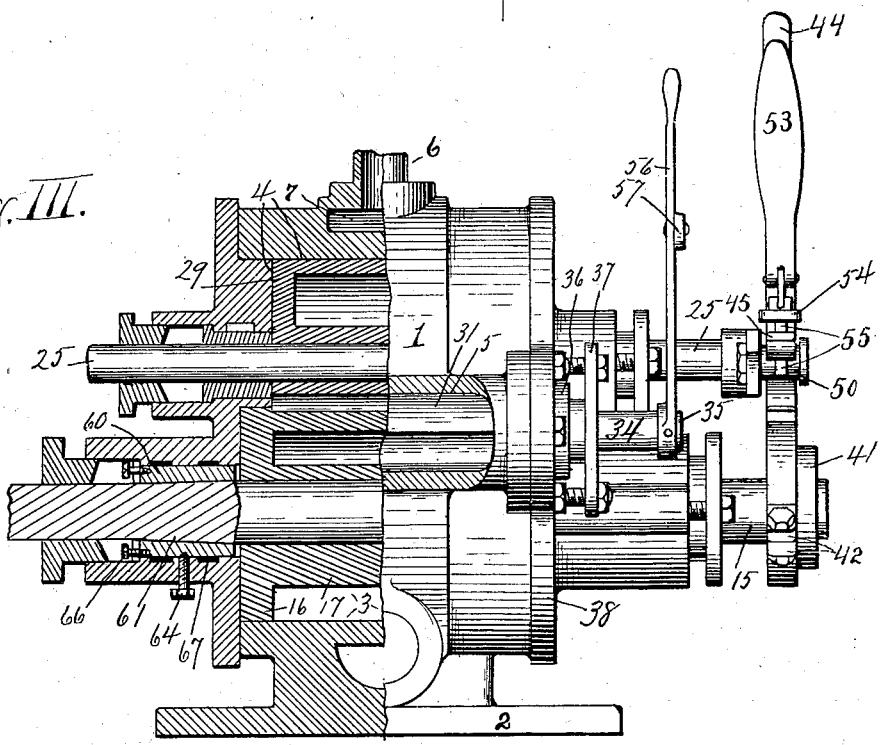

No. 651,809. Patented June 12, 1900.
P. T. PERKINS.
ROTARY MOTOR.
(Application filed Nov. 6, 1899.)
(No Model.) 3 Sheets—Sheet 3.
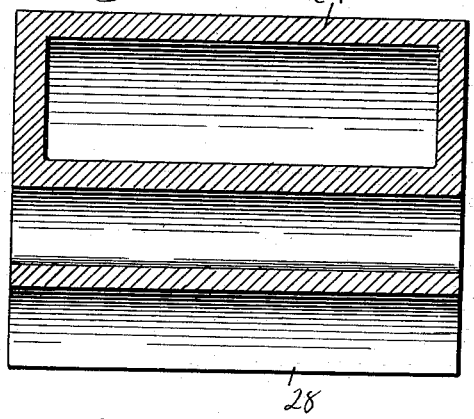
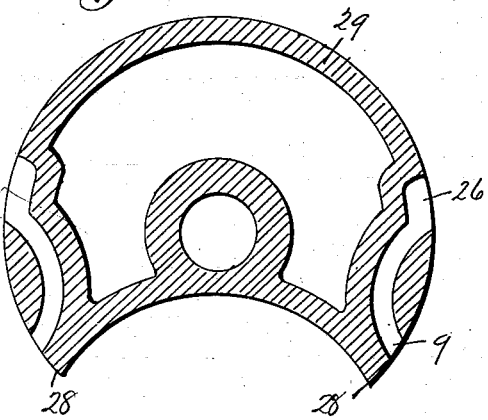
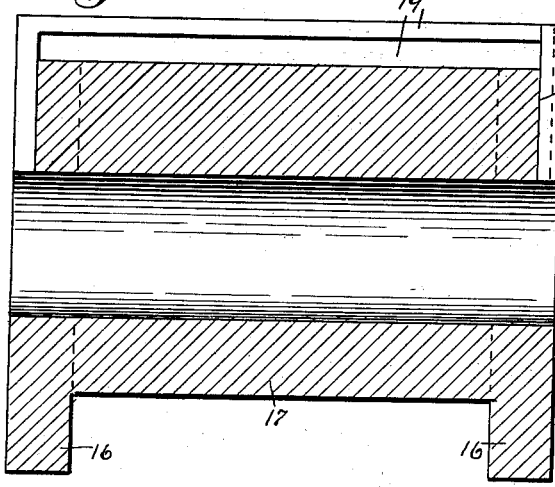
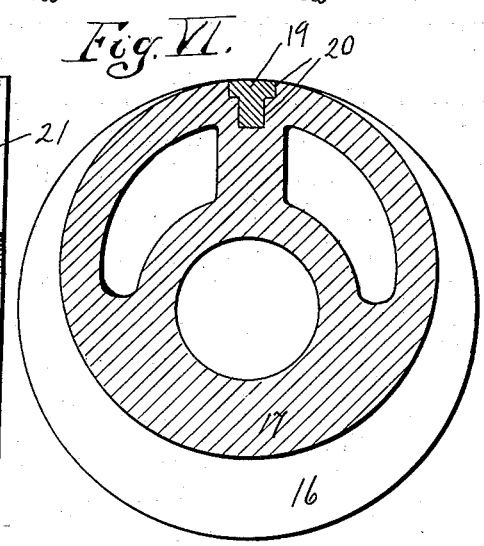
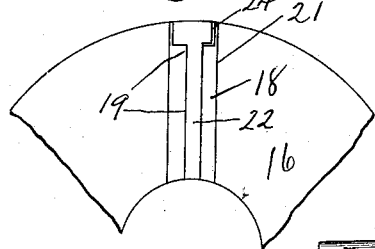
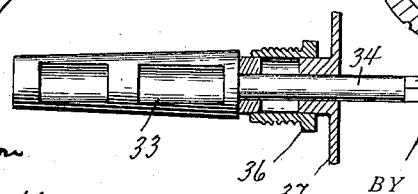
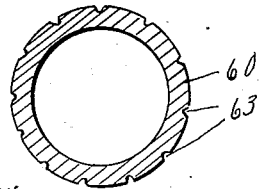
WITNESSES:
INVENTOR.
Pardon T Perkins
BY Alfred Wilkinson
ATTORNEY.

United States Patent Office.

PARDON T. PERKINS, OF OSWEGO, NEW YORK, ASSIGNOR OF TWO-THIRDS TO WILLIAM PIERSON JUDSON AND JAMES F. JOHNSON, OF SAME PLACE.

ROTARY MOTOR.

SPECIFICATION forming part of Letters Patent No. 651,809, dated June 12, 1900.

Application filed November 6, 1899. Serial No. 735,912. (No model.)

*To all whom it may concern:*

Be it known that I, PARDON T. PERKINS, of Oswego, in the county of Oswego, in the State of New York, have invented new and useful Improvements in Rotary Motors, of which the following, taken in connection with the accompanying drawings, is a full, clear, and exact description.

My invention relates to a rotary motor or engine of a strong and simple construction, consisting, essentially, of a cylinder, a piston having a cylindrical body arranged eccentrically between two integral heads, so as to be constantly in contact with the cylinder along one edge without the addition of abutments, movable heads, wings, &c., and of a valve connected to the piston reciprocated or rocked in unison therewith, so as to admit and cut off the steam at proper times.

My invention will be better understood by reference to the accompanying drawings, in which the same reference characters indicate the same parts in all the figures.

Figure I is a front elevation of my engine; Fig. II, a corresponding vertical cross-section; Fig. III, a side elevation, partly in section; Fig. IV, a top plan view with the reversing-lever and some attached parts removed; Figs. V and VI, respectively, longitudinal and cross sections of the piston; Figs. VII and VIII, respectively, longitudinal and cross sections of the valve; Fig. IX, an elevation of a portion of the end of the piston; Fig. X, a cross-section of the peculiar journal-bearing, and Fig. XI is an elevation of a throttle-plug detached.

In the figures, 1 indicates the main casing or shell, provided with a suitable base 2 and formed with the cylinder 3, valve-chamber 4, and throttle-chambers 5 5, all with their axes parallel.

6 is the steam-pipe through which the steam passes by one or the other channel 7 7 and port 8 8 and steam-inlet 9 9 to the cylinder, 10 10 being the exhaust-ports, connected through throttle or exhaust chambers 5 5 to the exhaust-channels 11 11, arranged adjacent to the cylinder and counteracting the radiation of heat therefrom. Concentrically in the cylinder is arranged the shaft 15, carrying the piston composed of the circular heads 16, of suitable thickness, fitting the cylinder steam-tight, and of a smaller cylindrical body 17, integral with said heads and so arranged eccentrically between them as to make contact in all positions with the inner surface of the cylinder along one edge or longitudinal line, called its "high point," and leaving a steam-space of varying width between all other portions of its periphery and the inner surface of the cylinder. This high point fits the cylinder steam-tight and may, if desired, be provided with a metallic packing-strip 19 to insure a tight joint. The packing-strip may be fitted to a groove 20 along this high point and bent to fit grooves 21 21, continued around the ends, one end of the packing-strip being solid and the other loose and slightly springy, so as to fit tight against the end of the cylinder. This packing-strip fits freely but snugly in the grooves, so that when it is worn slightly it will be forced outwardly by centrifugal force or steam, still maintaining a tight fit. In one end 18 of this packing-strip may be formed a groove 19, to which is fitted snugly a separate piece 22, having a slight clearance at 24, so that the steam will enter and force it out against the cylinder, making the joint tight and compensating for wear.

In the valve-chamber 5, opening along one side into the cylinder, is arranged concentrically the shaft 25, on which is fixed the valve 29, connected by exterior mechanism, to be described, to the piston, so that it is reciprocated or rocked continuously in harmony with the rotation thereof to open and close the steam-inlet and the exhaust at the proper times. It will be seen that the lower edge of the valve is formed in the arc of a circle slightly smaller than that of the cylinder, so that the central portion of this lower edge is arranged slightly above the circle of the cylinder, while the valve-edges or "wings" 28 28 extend one or the other into the cylinder, one being constantly in contact with the body of the piston, it being understood that the valve is exactly equal in length to said body, fitting snugly the body and between the heads of the piston. The steam-inlets formed in the valve are provided with enlarged mouths 26 26 to register and connect with the inner ends of the ports 8 8 as the position of the valve varies.

To the throttle-chambers 5 5, preferably tapering to insure a tight fit, are fitted tapering plugs 31 31, grooved on opposite sides, the smaller grooves 32 being adapted to connect the channel 7 to the steam-port 8, while the larger groove on the opposite side is adapted to connect an exhaust-port 10 with its exhaust-channel 11. While I have called these "throttle-chamber" and "throttle-plug," it will be understood that the term "throttle" correctly expresses the function of one of them only at a time, for while the steam is passing in through the throttle-chamber and groove in the plug on one side it is exhausting through the corresponding chamber and larger groove of the plug on the opposite side, which latter then operates as an exhaust-chamber and an exhaust-plug. Each plug is formed with an outwardly-extending shaft 34, having a square tip 35, and is held in position by screw-cap 36 and head 37, bolted in position over the main head or face-plate 38 of the engine.

Referring now to the external mechanism for operating the valve from the piston and for reversing, on shaft 15, extending outwardly through main head 38, is secured the eccentric 40, corresponding in position to the eccentric body of the piston and rotating freely in the collar 42, preferably made in two pieces and bolted snugly around it, 41 being the counterbalance.

44 is the reversing-lever, integral with or attached to said collar, on which is secured the grooved piece 45, provided with grooves 46 for making connection with the valve by means of arm 49, secured on shaft 25, to each end of which is bolted the grooved pin 50 for engaging with one or the other of the grooves 46, according to the position of the parts, as the engine is running in one direction or the other. These pins are preferably made eccentric, so as to be turned as desired to compensate for wear, as best shown in Fig. IV. To lock the pin in its proper groove, there is arranged on the reversing-lever a spring-lever 53, cross-head 54, and lock-pins 55, forced into position to bridge the grooves by the action of the spring and withdrawn therefrom to release the pins when the reversing-lever and spring-lever are grasped.

To the square tips 35 of the throttle-plug shafts are fitted corresponding arms 56 56, connected by bar 57, so that they may be forced to the right or left, reversing the position of the plugs simultaneously.

I have devised a peculiar journal-bearing for the main shaft, as best shown in Figs. III and X. The portion 61 of the shaft in the bearing is slightly tapered and to it is fitted the brass packing or bushing 60, formed with notches 63 63 on its outer periphery, with which engages the set-screw 64 to hold the packing in position. By this construction the set-screw may be loosened and the packing turned more or less to compensate for wear.

65 is a loose ring fitting the shoulders of the bearing, and 66 screws engaging therewith and with the bushing to retain the latter in position.

67 67 are oil-channels.

My construction is so simple that its operation will be clear with little further explanation. In the position shown in the figures, particularly in Fig. I, the rotation is in the direction indicated by the arrow, the steam entering through the steam-channel 7, throttle-chamber 5, groove 32, steam-port 8, and steam-inlet 9 on the left, while the exhaust is through the port 10, groove 33, and channel 11 on the right, the valve being moved through the outside connection without any sudden shock in harmony with the rotation of the piston to adjust the various inlet and outlet channels, &c., for the constantly-varying position of the piston.

In the position best shown in Fig. II, A indicates the high point, the valve having just begun to open to admit the steam, the exhaust-ports being so arranged that the exhaust opens immediately before the steam-inlet and remains open shortly after, so that the cylinder or steam-space behind the high point is constantly free and clear, the exhaust not closing until the high point has reached about the point D. It will be seen that the steam-inlet does not open until the center or high point has been passed, thus avoiding steam-pressure and consequent unnecessary friction thereby on the piston. This is known as "negative lead." Therefore when the inlet begins to open, the high point or the center having passed, the full pressure of the steam is directed against that and the curved surface of the cylinder to operate the engine, while the wing 28, (as here shown on the left,) in contact with the body of the piston, prevents back pressure thereon. As the piston approaches the point B the valve moves to open the steam-inlet wide, giving the full pressure of the steam, which may continue until the high point reaches C, thus getting the full pressure through a long stroke, more than three-quarters of the entire circumference, or the steam can be cut off at any point and drive the engine by expansion.

I have specified that the exhaust does not close until the high point has passed the port, thus insuring a perfect exhaust. The engine may be easily reversed by gripping the spring-lever to unlock the valve-pins and throwing the reversing-lever to one side, reversing the position of the piston, while at the same time the plug-arms are forced to the other side, reversing their position.

The important advantages of my engine are simplicity of construction, the absence of abutments or of wings, stops, cut-offs, or gates operated by springs or otherwise, which are subject to wear, fracture, or disarrangement.

My piston operates with one edge—that is, the high point—in contact with the cylinder, the metal packing being introduced to take up the wear. 70 70 are packing-strips introduced for a similar purpose, saving wear on the casing, it being easier and cheaper to renew the valve. All parts of the engine are arranged to work smoothly in unison without any sudden trip or movement of any part, with a consequent dangerous shock when the engine is running rapidly. Finally, my engine is cheap to construct, small and compact, standing low, having substantially no vibration, and very convenient for direct connection as to dynamos, &c. It is especially adapted for use with steam, but may be operated by other power, compressed air, water, &c.

Having thus fully described my invention, what I claim, and desire to protect by Letters Patent, is—

1. In a rotary engine, the combination of the shell or casing, formed integrally with a cylinder, a valve-chamber, throttle or exhaust chambers on each side, of a piston having circular heads fitting the cylinder and an integral body arranged eccentrically between said heads, so that one continuous edge of said body and heads makes contact with the inner surface of the cylinder along a line parallel to the axis, a valve arranged in said valve-chamber having its parallel lower edges on each side arranged so that one edge always extends into the cylinder, and exterior connections between the piston and the valve to rock the valve and maintain one of its lower edges or wings in contact with the body of the piston, inlets and steam-outlets, and throttle-plugs fitted to said throttle-chambers grooved to open the inlet on one side and the exhaust on the other, as the plugs are turned in one direction or the other.

2. In a rotary engine, the combination of the shell or casing, formed integrally with the cylinder-chamber, valve-chamber, throttle or exhaust chambers on each side, inlets to said throttle-chambers, steam-ports therefrom to the valve-chamber, exhaust-ports therefrom to the valve-chamber and exhaust-channels; of a piston having circular heads fitting the cylinder, and a smaller cylindrical body arranged eccentrically between said heads and integral therewith, so that the continuous edge of said body and said heads makes contact with the inner surface of the cylinder along one line parallel to the axis; of a valve arranged in said valve-chamber having its parallel lower edges on each side arranged so that one edge extends into the cylinder, and exterior connections between the piston and the valve to rock the valve and maintain one of its lower edges or wings in constant contact with the body of the piston, steam inlets and outlets, and throttle-plugs fitted to said throttle-chambers, grooved to open the steam-inlet on one side and the exhaust on the other as the plugs are turned in one direction or the other.

3. In a rotary engine, the combination of the shell or casing formed integrally with the cylinder, a valve-chamber, throttle or exhaust chambers on each side, the axes of said chambers being all horizontal and parallel, steam-inlets to said throttle-chambers, steam-ports therefrom to the valve-chamber, exhaust-ports therefrom to the valve-chamber and exhaust-channels from said plug-chambers; of a piston having circular heads fitting the cylinder and a smaller cylindrical body arranged eccentrically between said heads integral therewith, so that the continuous edge of said body and said heads makes a steam-tight contact with the inner surface of the cylinder along one line parallel to the axis; a valve fitted to the valve-chamber and having a reentrant lower surface, of equal length to the body of the piston, said valve having parallel lower edges or wings for making contact with the piston, and being formed with steam-inlets for the admission of steam to the cylinder on one side or the other as the piston revolves in the corresponding direction; and of exterior connections between the piston and the valve to rock the valve and maintain one of its lower edges or wings in constant contact with the body of the piston; of throttle-plugs fitted to said throttle-chambers, grooved to open the steam-inlet on one side and the exhaust on the other as the plugs are turned in one direction or the other, substantially as described and shown.

4. In a rotary engine, the combination of the shell or casing formed with the main cylinder or piston chamber, a substantially-cylindrical valve-chamber having its lower surface cut away to connect with the piston-chamber, throttle-chambers on each side, the axes of all of said chambers being horizontal and parallel, with steam-inlet channels, and exhaust-channels leading respectively to and from the throttle-chambers, and steam-inlet ports and exhaust-ports connecting said chambers with the valve-chamber; of a piston having circular heads fitting the cylinder snugly at each end and an integral cylindrical piston-body of smaller diameter than said heads and arranged eccentrically therewith, a "high point" along said body and the edge of said heads in constant close contact with the cylinder-surface; of a valve fitted to said valve-chamber equal in length to the body of said piston and having a reëntrantly-curved lower edge with downwardly-extending wings on each side thereof, adapted to make contact with said piston one at a time as the piston is rotated in one direction or the other, said valve being formed with steam-inlets in its sides adjacent to said wings; of plugs fitted to said throttle-chambers and having grooves for the admission of the steam and for the exhaust, and exterior connections between the piston and the valve to rock the valve as the piston is rotated.

5. In a rotary engine, the combination of the main casing formed integrally with a main cylinder or piston chamber, with a shorter substantially-cylindrical valve-chamber arranged thereabove and connected therewith along its lower surface, with throttle-plug chambers on each side about opposite the junction of said chambers, the axes of all of said chambers being horizontal and parallel, with steam-inlet channels to said throttle-chambers, steam-ports therefrom to said valve-chamber, exhaust-ports therefrom also to said valve-chamber, exhaust-channels from said throttle-chambers adjacent to said cylinder and communicating with exterior openings; of the piston, substantially equal in length to said cylinder, having circular heads, and an integral cylindrical body substantially equal in length to said valve-chamber, said body being of smaller diameter than said heads and arranged eccentrically therewith so that the continuous "high point" of said body and heads makes continuous close contact with the surface of the cylinder; of a valve substantially equal in length to said body fitted to said valve-chamber and having parallel wings on its lower edges adapted one at a time to fit snugly against the body of said piston between said heads, and formed with steam-inlets for admitting the steam from the channels in the casing to the cylinder; of plugs fitted to said throttle or exhaust chambers and having smaller grooves on one side for the admission of the steam and larger grooves on the opposite for the exhaust, and exterior connections between the piston and the valve to rock the valve and maintain one of its lower edges or wings in constant contact with the body of the piston between the heads.

6. In a rotary engine the main shell or casing formed with a cylinder or cylindrical piston-chamber below, a substantially-cylindrical valve-chamber arranged above said cylinder-chamber, opening thereinto along its lower side, tapering throttle-plug chambers or exhaust-chambers on each side adjacent to the junction of said cylinder and valve-chamber, the axes of all of said chambers being horizontal and parallel with the steam-inlet openings above, and steam-channels therefrom to said throttle-chambers, with steam-ports from said throttle-chambers to said valve-chamber, with exhaust-ports from said valve-chamber to said throttle-chamber, and with exhaust-channels extending downwardly from said throttle-chambers along the outer surface of the cylinder to exhaust-openings, substantially as described and shown.

7. In a rotary engine, the combination of the main casing, formed integrally with the cylinder, a valve-chamber, throttle-plug chambers on each side, steam inlets and outlets, of a piston fitted to said cylinder, a shaft therein having a tapering portion arranged in the journal-bearing at the rear of the casing, a softer metallic packing fitted to said tapering portion in said journal-bearing and formed with notches on its periphery, and a set-screw to engage with one of said notches to hold the packing or bushing in position, and means to retain said bushing against end movement.

8. In a rotary engine, the combination of the shell or casing, formed integrally with the main cylinder below, with a substantially-cylindrical valve-chamber above the cylinder and open thereinto on its lower side, tapering throttle-plug chambers on each side about opposite the junction of said cylinder and chamber, the axes of said cylinder and chambers being parallel and horizontal, with a steam-pipe above and steam-channels formed in the casing around said valve-chamber to said throttle-chambers, with ports connecting said throttle-chambers to the valve-chamber, with exhaust-ports also connecting the valve-chamber to the throttle-chambers, with exhaust-channels formed in the casing leading downwardly from the outer ends of the respective exhaust-ports around the cylinder to exterior openings; of a piston having circular heads fitting the cylinder snugly at each end, an integral cylinder piston-body of smaller diameter than said heads and arranged eccentrically therebetween so that the continuous edge of said body and heads makes contact with the cylinder-surface along one horizontal axial line or "high point" fitting steam-tight, a shaft axially arranged in said cylinder extending outwardly through the front and rear plates of the casings, said piston being formed with a groove along said "high point" continuing around the ends of the heads, a metallic packing-strip fitting thereto and bent around the heads, one end solid, one end slightly elastic to make a steam-tight packing, a supplementary groove in one of said ends and a piece fitted thereto; a horizontal shaft axially arranged in the valve-chamber parallel to said main shaft and directly above it extending outwardly through the face-plate; a valve equal in length to the body of said piston so that its lower portion will fit between the heads, fitting snugly in said chamber and having an upwardly or reëntrantly curved lower edge formed in the arc of a circle smaller than that of the cylinder so that of the wings or downwardly-extending lower edges of said valve, one always extends into the steam-space and one is in close contact with the body of the rotating piston, said valve being also formed near its side edges with steam-inlets, to conduct the steam from the respective steam-ports to the cylinder or steam-space and having enlarged mouths to register with the inner ends of the respective steam-ports in the varying positions of the valve; tapering plugs fitting said throttle or exhaust chambers and having smaller grooves on one side to connect the steam-channel with the steam-port when the plugs are in one position, and larger grooves on the opposite side to connect the exhaust-channels when in the reverse position, axial shafts forwardly and outwardly extending from said plugs having square ends, screw-caps and heads to secure said plugs in position along the exterior of said engine, an eccentric secured on the outer end of said main shaft, a two-part collar fitted snugly to said eccentric, a reversing-lever, secured to said collar and extending upwardly therefrom, a grooved piece with grooves on opposite sides secured on said reversing-lever, a spring-lever journaled thereon and connected to a cross-head sliding on said reversing-lever, locking-pins secured to said cross-head and bridging said grooves; plug-levers secured to said squared ends of the plugs extending upwardly parallel to each other, and a connection between said plug-levers, substantially as described and shown.

In testimony whereof I have hereunto signed my name.

PARDON T. PERKINS. [L. S.]

Witnesses:
ALFRED WILKINSON,
M. T. BROWNELL.